United States Patent [19]

Magin et al.

[11] Patent Number: 5,390,348
[45] Date of Patent: Feb. 14, 1995

[54] SYSTEM FOR TRACKING AND CORRECTING DRIFT AND DISPERSION IN SATELLITE TRANSMISSION SIGNALS

[75] Inventors: Gregory A. Magin, Ocala, Fla.; John W. G. McMullen, Provo, Utah

[73] Assignee: Creative Digital Inc., Orem, Utah

[21] Appl. No.: 835,253

[22] Filed: Feb. 12, 1992

[51] Int. Cl.$^6$ .............................................. H04B 1/10
[52] U.S. Cl. ................................. 455/63; 455/182.2; 455/192.2; 455/310; 455/317; 455/12.1
[58] Field of Search ...................... 455/63, 12.1, 13.2, 455/71, 182.2, 192.2, 196.1, 202, 208, 255, 260, 257, 265, 259, 296, 237.1, 310, 317, 70, 316; 375/97; 329/318, 319, 320

[56] References Cited

U.S. PATENT DOCUMENTS

| | | | |
|---|---|---|---|
| 3,942,115 | 3/1976 | Wolejsza, Jr. | 455/71 |
| 4,241,452 | 12/1980 | Gibson et al. | 455/263 |
| 4,539,707 | 9/1985 | Jacobs et al. | 455/265 |
| 4,607,393 | 8/1986 | Nolde et al. | 455/208 |
| 4,912,773 | 3/1990 | Schiff | 455/71 |
| 5,109,532 | 4/1992 | Petrovic et al. | 455/63 |

*Primary Examiner*—Edward F. Urban
*Assistant Examiner*—Nguyen Vo

[57] ABSTRACT

A system for tracking and correcting drift and dispersion of carrier frequencies in a transmitted signal which includes one or more carrier frequencies and a pilot frequency. The system includes one or more carrier tuners, each for receiving the transmitted signal and for deriving from the received signal and IF carrier signal representing a respective carrier frequency, a mixer for mixing the IF carrier signal and a local oscillator signal to produce a resultant IF information signal, and a demodulator for demodulating the resultant IF information signal to recover the transmitted information. The system also includes a pilot tuner for receiving a transmitted signal, the pilot tuner deriving from the received signal an IF pilot signal representing the pilot frequency, a pilot mixer for mixing the IF pilot signal and the local oscillator signal to produce a resultant pilot signal, a local oscillator responsive to a control signal level for developing a local oscillator signal having a frequency corresponding to the control signal level and for supplying the local oscillator signal to the carrier mixers and pilot mixer to compensate for any drift or dispersion of frequency of the IF carrier signals and IF pilot signal, and a frequency discriminator for detecting frequency drift and dispersion of the IF pilot signal from a predetermined center frequency and for supplying to the local oscillator a control signal whose level identifies the drift and/or dispersion.

9 Claims, 3 Drawing Sheets

SYSTEM FOR TRACKING AND CORRECTING DRIFT AND DISPERSION IN SATELLITE TRANSMISSION SIGNALS

BACKGROUND OF THE INVENTION

This invention relates to a satellite transmission and receiving system in which audio and data information, among others, may be transmitted and received more efficiently and economically while complying with regulatory agency signal strength limitations.

Transmission of information such as audio, data, video, and the like via communication satellites has become commonplace in today's information technology society. In carrying out such transmission, it is desirable to use the strongest signal allowable so that the transmitted signal may be more accurately received by the least expensive equipment possible, i.e., using the smallest satellite receiving dish possible. On the other hand, the stronger the transmitted signal, the greater likelihood there is that such signal could interfere with other signals on the same satellite having closely related frequencies, signals located in nearby space but directed to or coming from other satellites, and signals transmitted from ground stations directly to other ground stations. In addition, most countries have established maximum acceptable satellite signal strengths for signals in given frequency bands. Oftentimes, these maximum limits make impossible or, at least, impractical, the use of smaller satellite receiving dishes since such dishes are not capable of accurately receiving signals whose strengths are under the allowed maxima. Of course, small satellite receiving dishes are desirable because they are easy to install and align, less aesthetically offensive, and are much lower in cost than larger more conventional satellite receiving dishes.

A number of modulation and transmission methods have been developed for transmitting signals via satellites some of which have attempted to overcome the signal strength limitation problem. The most commonly used method, however, known as the single carrier per channel (SCPC) method, generally does not overcome this problem and so the larger, more expensive satellite receiving dishes must be used with the method. In the SCPC method, the frequency bandwidth available for transmission of signals is divided into carriers, each having a bandwidth different from the bandwidths of the other carriers and each being assigned a "center frequency" located in the center of the carrier bandwidth. Each source of information such as audio information, data information, video information, etc., is considered a "single channel" and is modulated onto a respective one of the carriers, and each carrier carries only the information of its respective channel. Among the advantages of the SCPC method are the flexibility in the assignment of frequency and bandwidth and the allocation of power to each particular carrier, and generally lower power requirements. The major disadvantages of the SCPC method is the need for frequency stability in the reception of the transmitted signal and this generally requires the use of high stability (and high cost) crystals located in constant temperature ovens, and the use of phase-locked oscillators located on the satellite receiving dish. Also, as already mentioned, the limitations imposed on transmitted signal strength generally eliminates the use of small size satellite receiving dishes with the SCPC method.

One approach to overcoming the signal strength limitation problem is the so-called "spread spectrum" method. This method allows for the transmission of a very strong signal by moving the energy of the signal rapidly among different frequencies at the transmitting end. In this manner, the average signal strength is spread among a number of frequencies and therefore is maintained below the maximum allowed. However, this approach is expensive, requiring high cost receiving equipment, and only a few satellite carriers necessary with this method can be accommodated by a satellite transponder.

Another approach to overcoming the signal strength limitation problem is referred to as the FM-FM method and allows many carriers to share a common transmitter and satellite transponder. In particular, a number of frequency modulated carriers are combined into a common signal and then this common signal is modulated again onto a transmitted carrier. For example, a number of FM audio and frequency shift keyed (FSK) data signals may be multiplexed and modulated onto a wide band transmitted FM carrier. Among the disadvantages of this method is that all signals must originate from the same point since only one transmitter may be used and thus operators must deliver their audio or data information to the transmitter site; also, an entire satellite transponder or significant portion thereof, must be allocated for the method.

SUMMARY OF THE INVENTION

It is an object of the invention to provide a satellite communication system capable of transmitting a variety of information such as audio, data and video information, via satellites to small satellite receiving dishes.

It is another object of the invention to provide such a system which meets the signal power density limitations established by regulatory agencies for satellite transmission.

It is a further object of the invention to provide such a system in which minimal error or loss of transmitted signal occurs at the receiver.

It is an additional object of the invention to provide such a system which may utilize low cost conventional components.

It is also an object of the invention to provide such a system in which drift or dispersal of frequencies in a transmitted signal may be accurately tracked and compensation made therefor in an efficient and reliable manner.

It is still another object of the invention to provide such a system which requires the use of relatively small and inexpensive transmitters.

The above and other objects of the invention are realized in a specific illustrative embodiment of a satellite communication system which includes a transmitting station and a receiving station for respectively transmitting and receiving information via a satellite. The transmitting station has a plurality of information modulators, each for modulating information from a corresponding audio, data, video, etc. information source (or channel) onto an information carrier signal having a predetermined center frequency. Also included in the transmitting station is a pilot signal oscillator for producing a pilot signal having a reference frequency separated by predetermined amounts from all information carrier frequencies which, in turn, are separated in frequency from one another by predetermined amounts. A local oscillator is provided for producing a local oscillatory signal whose frequency varies in accordance with the application thereto of a dispersal waveform. A dispersal waveform generator supplies a time varying voltage dispersal waveform to the local oscillator to cause the local oscillatory signal frequency to periodically vary or "disperse." The information carrier signals, pilot signal and local oscillatory signal are all supplied to a signal mixer which produces an intermediate frequency composite signal with information carrier frequencies and a pilot frequency which synchronously vary or "disperse" over a predetermined range. The composite signal is passed to a bandpass filter which selects either the sum or difference frequencies produced by the mixer process, for supply to an up-convertor which increases the frequencies to produce an information signal for transmission to a relay satellite.

The receiving station includes a satellite receiving dish for receiving information signals relayed by the satellite, and a down-convertor, which may consist of several stages, for converting the frequencies in the information signals to a baseband signal containing frequencies corresponding to the information carrier frequencies and pilot frequency, separated in frequency by amounts proportionate to the separation of the information carrier and pilot frequencies in the original composite signal. Also included are a plurality of carrier tuners, each for receiving the baseband signal and deriving therefrom an IF carrier signal containing information corresponding to information contained in a respective one of the original information carrier signals. Each of the carrier tuners includes a carrier mixer for mixing the IF carrier signal and a compensating oscillatory signal to produce a resultant information signal, and a demodulator for demodulating the resultant information signal to recover the information contained therein.

The receiving station further includes a pilot tuner for receiving the baseband signal and deriving therefrom an IF pilot signal. Finding the pilot signal (and its frequency) will allow finding the carrier signals since the frequency separation between the carrier signals and pilot signal is know. The pilot tuner includes a pilot mixer for mixing the IF pilot signal and the compensating oscillatory signal to produce a resultant pilot signal, a compensating oscillator responsive to a voltage signal for producing a compensating oscillatory signal having a frequency determined by the level of the voltage signal, and for supplying the compensating oscillatory signal to the carrier mixers and the pilot mixer. The pilot tuner further includes a frequency detector for detecting the frequency of the resultant pilot signal and any frequency drift or dispersion of the resultant pilot signal from a predetermined center frequency, and a controller coupled to the frequency detector for supplying to the compensating oscillator a voltage signal whose level is a function of the detected frequency of the resultant pilot signal, so that the compensating oscillator produces a compensating oscillatory signal which, when mixed with the IF carrier signals and IF pilot signal, counters any frequency drift and dispersion occurring in such signals by the amount of drift and dispersion detected in resultant pilot signal.

In effect, a dispersal signal is utilized at the transmitting station to spread the energy of the information carrier signals and the pilot signal over a wider bandwidth to thereby maintain the signal strength within regulatory limits. In carrying out such dispersal, the center frequency of the information carrier signals and the pilot signal are moved synchronously at a gradual rate so that at the receiving station, the pilot signal can be found and the frequency relationship between the pilot signal and the information carrier signals established. In other words, the pilot tuner tracks the pilot signal frequency dispersion (and the drift which may occur with temperature changes, component deficiencies, etc.) and signals the carrier tuners to similarly track and follow the dispersion (and drift) of the information carrier center frequencies. This allows narrow bandwidth signals to be tracked and demodulated to recover the desired information.

Although the system is designed to intentionally disperse the frequencies of the transmitted signals and then track such dispersion at the receiving station, the system is also useful for simply tracking drift which may occur in the transmitted and received signal, even if no dispersion is intentionally produced.

BRIEF DESCRIPTION OF THE DRAWINGS

The above and other objects, features and advantages of the invention will become apparent from a consideration of the following detailed description presented in connection with the accompany drawings in which.

DETAILED DESCRIPTION

Figure 1:
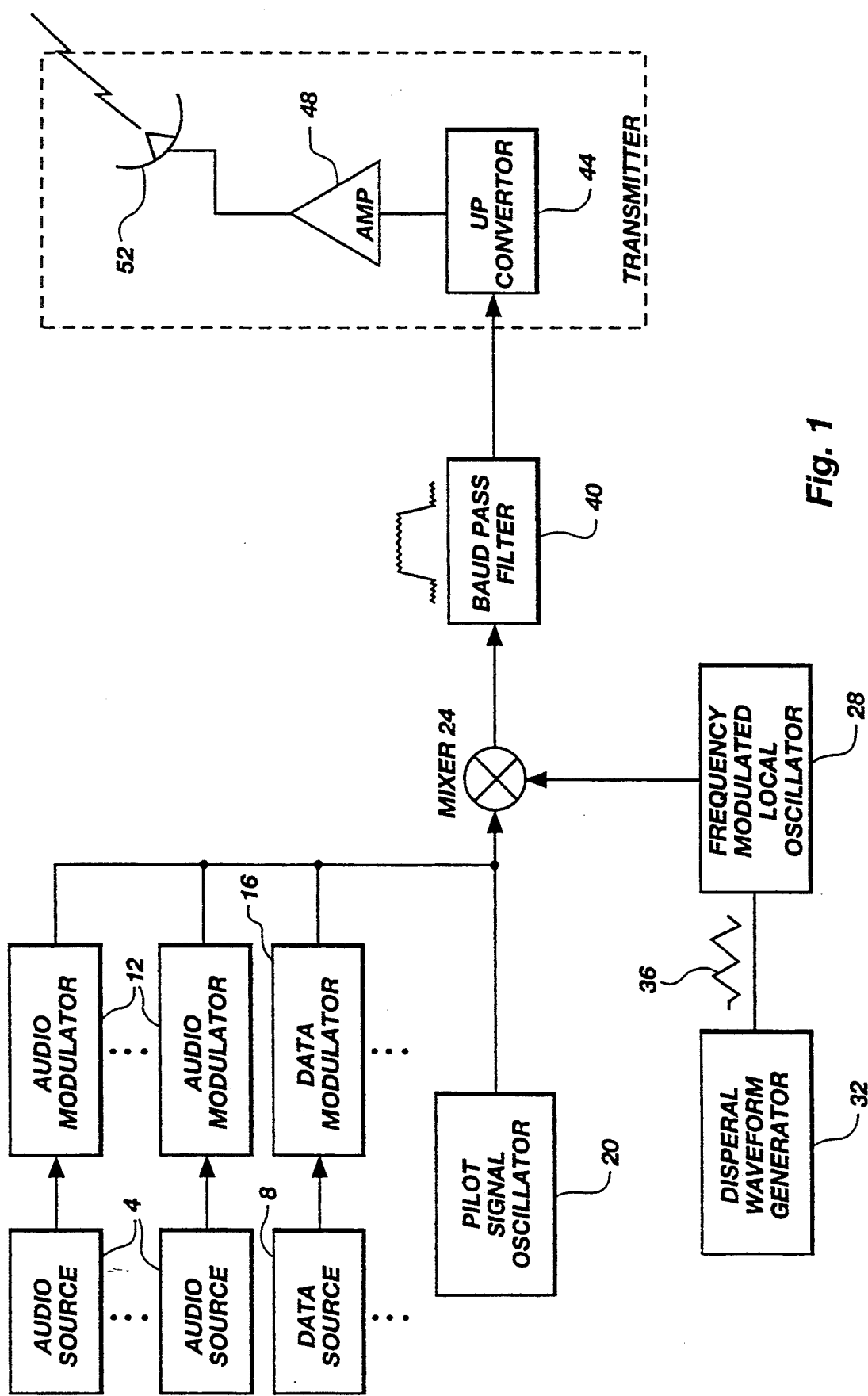
FIG. 1 is a schematic diagram of a satellite communication system transmitting station made in accordance with the principles of the present invention.

Referring to FIG. 1, there in shown a plurality of information sources such as audio sources 4 (which might be compact disk players or tape playback equipment) and data sources 8 (which might be computers, news wire services or facsimile equipment). Other information sources such as video could also be provided and accommodated and the showing in FIG. 1 of the audio and data sources is only to illustrate that one or more information sources may be accommodated with the present system.

Audio and data information, in the form of electrical signals, are supplied to respective audio modulators 12 and data modulators 16 where the information is modulated onto respective carrier signals, each of whose center frequency differs from the center frequency of every other carrier signal. For example, the audio and data carrier center frequencies could be 7, 6.8, 6.6, 6.4, etc. MHz. The modulators 12 and 16 could be any type of conventional modulator such as FM (frequency modulation), FSK (frequency shift keying), PSK (phase shift keying), and quadriture PSK, or other continuous carrier signal modulator.

Also provided in the transmitter of FIG. 1 is a pilot signal oscillator 20 for producing a pilot signal having a frequency which is spaced from the center frequencies of the information carrier signals by predetermined amounts and this might, for example, be set at a frequency of 7.2 MHz. As will become clear later on, the pilot signal is used as a reference frequency signal to enable a receiving station to locate and track the pilot signal and thus locate and track the carrier frequency signals containing desired information. The modulated carrier frequency signals and the pilot signal are all supplied to a mixer 24 which is conventional in design as is the pilot signal oscillator 20.

A second input to the mixer 24 comes from a frequency modulated local oscillator 28 which produces a local oscillatory signal of significantly higher frequency than the frequencies of the carrier signals or pilot signal such as, for example, 77 MHz. Coupled to the oscillator 28 is a dispersal wave form generator 32 which supplies to the oscillator a time-varying voltage waveform preferably of low frequency such as, for example, 20–30 Hz. Although a variety of waveform shapes could be utilized, a modified triangular shape such as shown at 36 is preferred since, at the receiving end, it facilitates the location and tracking of received signal frequencies as will be further explained hereafter. The dispersal waveform generator 32 might illustratively, comprise a digital to analog convertor driven by a digital input signal generated by a digital signal generator included within the dispersal waveform generator. The dispersal waveform 36 supplied to the local oscillator 28 causes the oscillator to vary or sweep the frequency of its output signal over some predetermined range about its center frequency such as, for example, plus and minus 100 KHz.

The mixer 24 mixes the local oscillatory signal, the modulated information carrier signals, and the pilot signal to produce sum and difference frequency signals which are then supplied to a band pass filter 40 which filters out the signal which composes the sum of the frequencies and passes the signal which composes the difference of the frequencies (but either the sum or the difference signal could be used). An up-convertor 44 further converts and increases the frequency of the signal to a level suitable for satellite transmission and the signal is then supplied to an amplifier 48 which amplifies the signal and supplies it to a satellite dish transmitter 52 for transmission to a satellite.

All of the individual components of the transmitter of FIG. 1 are conventional and, well-known, but they have been combined and used in a novel manner as will be further evident hereafter.

Figure 2:
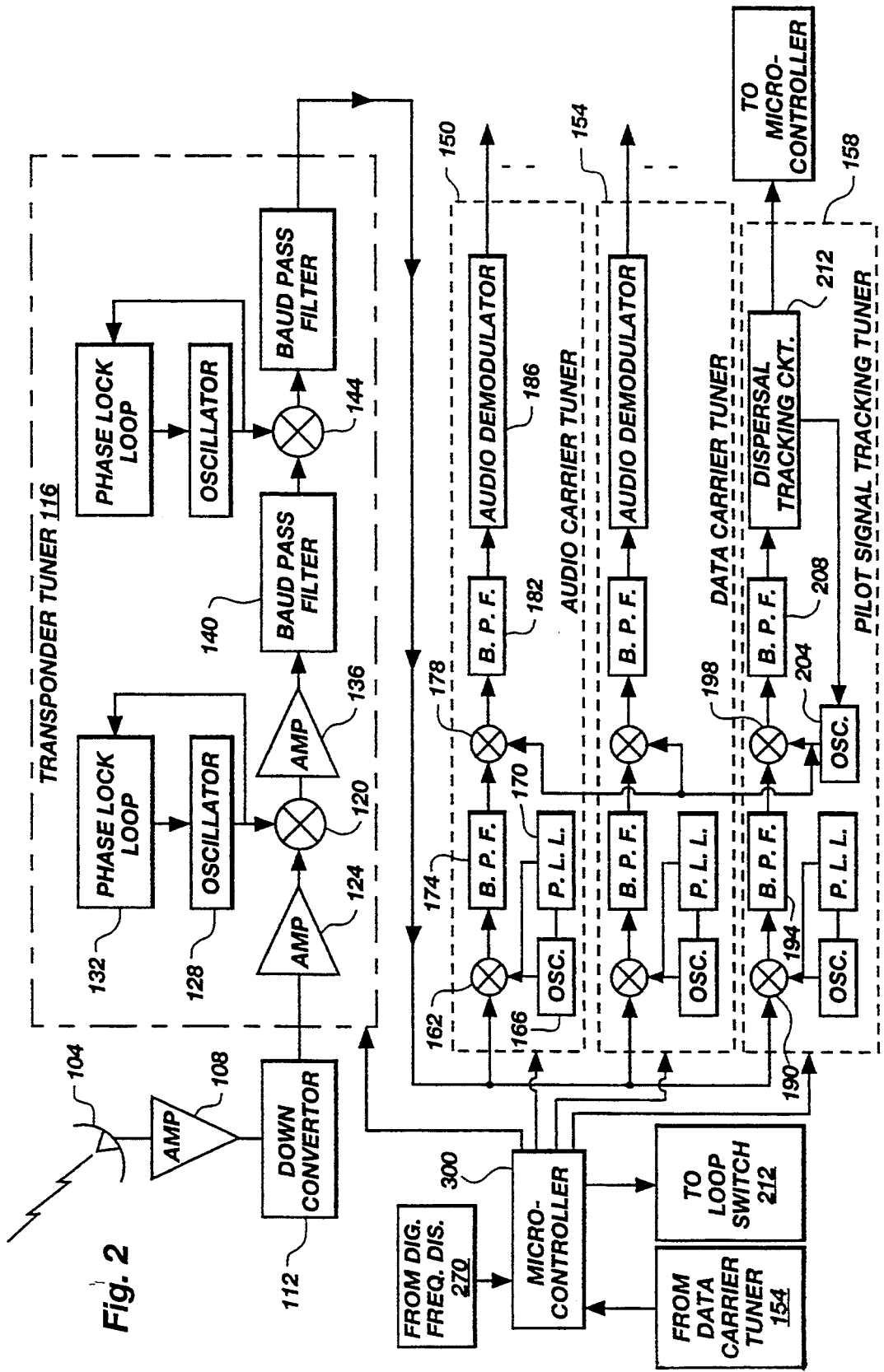
FIG. 2 is a schematic diagram of a satellite communication system receiving station made in accordance with the principles of the present invention.

Referring to FIG. 2, there is shown one illustrative embodiment of receiving equipment for receiving information signals relayed by a satellite, such equipment including a satellite receiving dish 104 which receives the relayed information signals and supplies them to an amplifier 108 which amplifies the signals and, in turn, supplies them to a down-convertor 112. The down-convertor 112 converts down the frequencies in the received signal to an intermediate lower frequency range such as 950 to 1450 MHz, while maintaining the relative separation between the pilot frequency and the carrier frequencies. The satellite receiving dish 104, amplifier 108, and down-convertor 112 are all conventional devices.

Each down-converted signal is then supplied to a transponder tuner 116 where the signal is further down-converted to a lower frequency range and where the desired frequency band, referred to as the baseband signal, is selected for passing onto the next stage in the receiving station. Illustratively, the baseband signal range is 4–8 MHz. The transponder tuner 116 is shown to include two stages for down conversion of the frequencies but there could be as many stages as desired. Each stage includes a mixer such as mixer 120 which receives the down-converted signal (after amplification by amplifier 124) from the down-convertor 112, and also receives an oscillatory signal from an oscillator 128 whose output is maintained stable by a phase lock loop circuit 132. The mixer 120 mixes the two input signals and supplies the resultant signal to an amplifier 136 and then to a band pass filter 140 where the desired frequency band is selected and supplied to another mixer 144 for further mixing and down-converting of the frequency range.

At the transponder tuner stage in most prior art systems, generally great expense is expended to provide equipment and components to maintain signal accuracy and stability. With the present invention, the transponder tuner stage may utilize low cost components since the next stage of the receiving station, as will next be described, provides for compensation of frequency drift and dispersal which may be present in the received signals.

Coupled to the transponder tuner 116 for receiving the baseband signal produced thereby are one or more audio carrier tuners 150, one or more data carrier tuners 154, and a pilot signal tracking tuner 158. As will be described in detail, the pilot signal tracking tuner 158 locates, locks on, and tracks the pilot signal frequency and provides signals to the audio carrier tuners 150 and data carrier tuners 154 to similarly lock onto and track respective information carrier signals to enable demodulation of the signals and recovery of the transmitted information. In effect, the pilot signal tracking tuner 158 counters any dispersion or drift of frequency present in the pilot signal and information carrier signals so that each carrier channel is confined to its normal narrow bandwidth. The signal-to-noise ratio is thereby improved because the higher power (allowed by dispersal) is concentrated in a narrow bandwidth after dispersal tracking is achieved.

Each audio and data carrier tuner includes a mixer, such as mixer 162 of tuner 150, which receives the baseband signal and mixes it with a local oscillator signal received from oscillator 166. The stability of the output of oscillator 166 is maintained by a conventional phase lock loop circuit 170 to which it is coupled. The mixer 162 mixes the two input signals and supplies the sum and difference frequencies to a bandpass filter 174 which, in turn, filters out either the sum or difference frequencies and passes the other to a second mixer 178. The center frequency of the frequencies passed to the mixer 178 might illustratively be 10.7MHz. The mixer 178 mixes the signal received from the bandpass filter 174 with a master local oscillator signal (which, for example, might be 11.7 MHz) received from an oscillator 204 of the pilot signal tracking tuner 158. It is this master local oscillator signal which allows the audio carrier tuners 150 and data carrier tuners 154 to follow any dispersion or drift present in the corresponding information carrier signals to enable demodulation thereof. The mixer 178 mixes the two input signals and supplies them to a bandpass filter 182 which selects the desired mixing product, for example, a 1 MHz centered information carrier signal. This signal is then supplied to an audio demodulator 186 where the information contained in the corresponding information carrier signal is recovered and supplied to a utilization device (not shown). Each of the audio carrier tuners 150 and data carrier tuners 154 operate in the same manner described above for processing respective information carrier signals.

The baseband signal developed by the transponder tuner 116 is also supplied to the pilot signal tracking tuner 158 and to a mixer 190 included therein. The function of the pilot signal tracking tuner 158 is to locate and track the transmitted pilot signal, and this is done with a first stage mixer 190 and bandpass filter 194 which operate in the manner similar to the first stage of the information carrier tuners. The bandpass filter 194 passes the filtered intermediate frequency (IF) pilot signal to a mixer 198 where it is mixed with the master local oscillator signal supplied by the oscillator 204. As will be described momentarily, the frequency of the oscillator 204 is continually adjusted to counter any dispersion or drift occurring in the received information carrier signals and pilot signal and, in effect cancel such dispersion or drift.

The mixer 198 supplies the mixing product to a bandpass filter 208 which selects and passes the desired mixing product to a dispersal tracking circuit 212. The dispersal tracking circuit 212 processes the received signal and supplies a voltage to the oscillator 204 to vary the frequency of the output of the oscillator as necessary to cancel any dispersion or drift occurring in the received information carrier signals and pilot signal.

Figure 3:
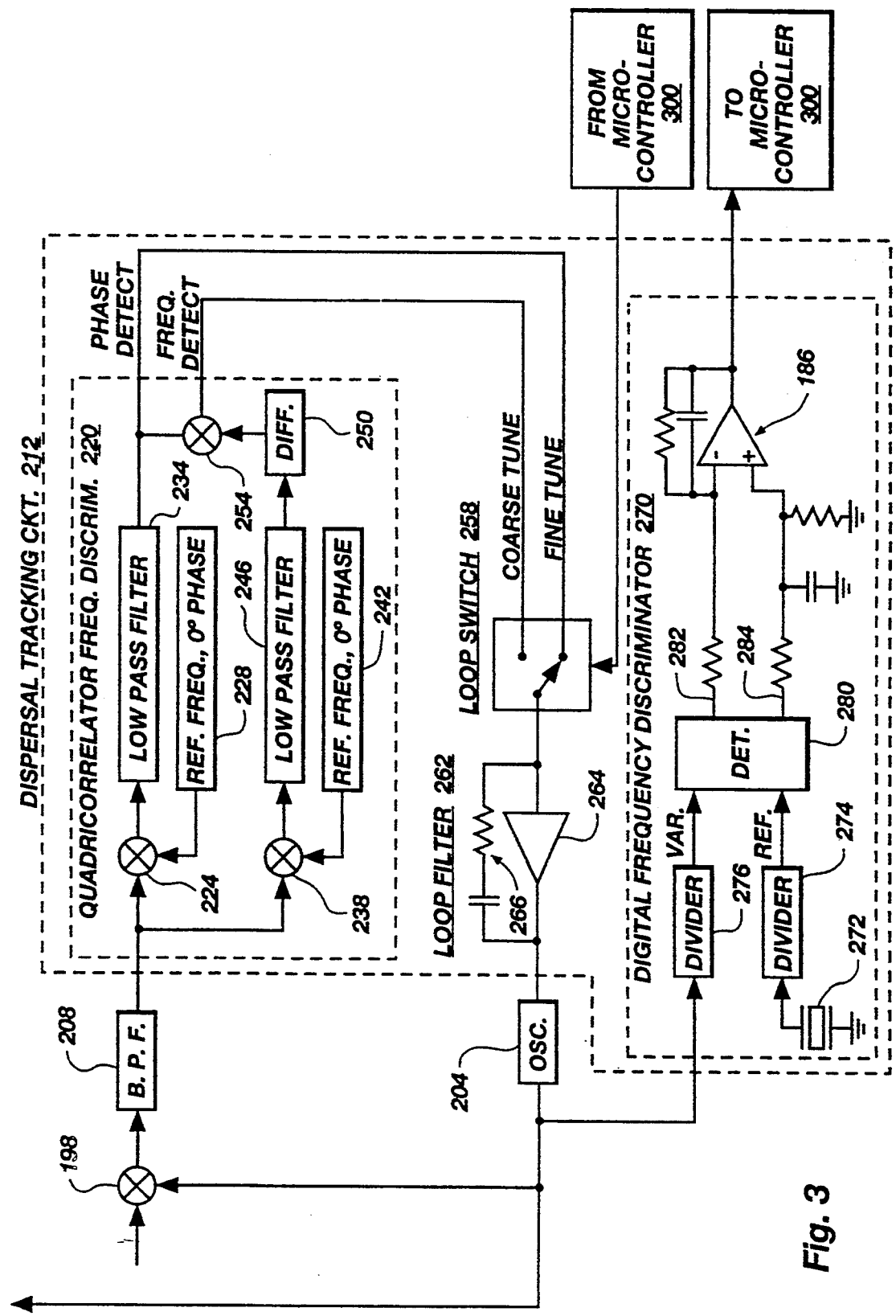
FIG. 3 is a schematic diagram of one illustrative embodiment of the dispersal tracking circuit of the pilot signal tracking tuner of FIG. 2.

The dispersal tracking circuit 212 is shown in detail in FIG. 3 to include a quadricorrelator frequency discriminator 220. The quadricorrelator frequency discriminator (QFD) 220 is of conventional design (see Gardner, F. M., *Phaselock Techniques*, Wiley, New York, 1979, pp. 84–87) and includes a mixer 224 for receiving and mixing the IF pilot signal from the bandpass filter 208, and a reference frequency signal (e.g., 1 MHz) received from a reference frequency generator 228. The mixing product is supplied by the mixer 224 to a low pass filter 234 which passes a signal having frequencies, for example, in the range of direct current (DC) to 25 KHz, which serves as a "phase error" signal. The IF pilot signal is also supplied to a second mixer 238 of the QFD 220 which mixes it with a second reference frequency signal, (e.g., also 1 MHz) ninety degrees out of phase with the first reference frequency signal, supplied by a reference frequency signal generator 242. The mixing product is supplied to a second low pass filter 246 which passes a signal having frequencies, for example, in the range of DC to 25 KHz to a differentiator 250. The differentiator 250 produces a signal representing the derivative of the output signal from the low pass filter 246 and passes it to a multiplier 254 which multiplies the derivitive with the output of the low pass filter 234 to develop a "frequency error" signal. The frequency error signal contains a DC component proportional to the frequency difference between the IF pilot signal and the signal from the reference frequency generator 242.

The frequency error signal, provides a coarse tuning signal for initially acquiring the pilot signal, and the phase error signal, provides a fine tuning signal for precisely tracking the pilot signal. Both the frequency error signal and phase error signal are supplied to a loop switch 258 which, based on its setting, passes either one or the other of the signals to a loop filter 262. Initially the loop switch 258 would be set to pass the frequency error signal to the loop filter and thereafter the switch would be set to pass the phase error signal. The loop switch 258 is controlled by a micro controller 300 (FIG. 2) as will be discussed later. The frequency error signal and phase error signal are supplied to the loop filter 262 which integrates the error signals to develop a voltage signal for supply to the master local oscillator 204 to establish the output frequency of the oscillator as is necessary to allow tracking of the pilot signal frequency. The voltage signal from the loop filter 262 simply controls the oscillator 204 to correct for frequency drift or dispersion in the received pilot signal. The loop filter 262 includes a conventional operational amplifier/integrator 264 and a capacitor/resistor circuit 266 coupled in parallel with the amplifier/integrator to establish the frequency response for the filter. It will be recognized that the QFD 220, loop switch 258 and loop filter 262 form an automatic frequency control circuit for acquiring and locking onto the pilot signal frequency. There are a number of other types of conventional automatic frequency control circuits which could be used but that shown in FIG. 3 provides a very linear and precisely centered output frequency signal.

The microcontroller 300 (FIG. 2) receives demodulated data from the data demodulator of the data carrier tuner 154 and, through conventional error checking methods such as cyclic redundancy check characters, determines when correct data is being received. When this occurs, the microcontroller signals the loop switch 258 to convert from "coarse tune" input lead to the "fine tune" input lead after which the quadricorrelator frequency discriminator 220 and loop closely tracks and locks onto the frequency of the incoming signal.

Alternatively to controlling the setting of the loop switch 258 by the microcontroller 300, a simple timer could be provided with the loop switch to set the switch on the "coarse tune" input upon initial receipt of transmitted information (and in response to receipt, for example, of the baseband signal from the transponder tuner 116), and then to set the switch to the "fine tune" input after a predetermined period of time necessary to frequency lock onto the incoming signal.

The output of the oscillator 204, as well as being supplied to various mixers in the tuners 150, 154 and 158, is also supplied to a digital frequency discriminator 270 (FIG. 3). This circuit develops a DC output voltage, which is supplied to the microcontroller 300, to indicate if the output frequency of the oscillator 204 is higher or lower than a reference frequency developed by a stable crystal oscillator 272. The oscillator 272 runs, for example, at 4 MHz and is supplied to a divider circuit 274 which divides down the frequency to a lower level of, for example, 100 KHz. The output of the oscillator 204 is also supplied to a divider 276 where the frequency of the output (for example 11.7 MHz) is divided down to yield a "variable" signal at close to, for example, 100 KHz also. Both the variable signal from the divider 276 and the reference signal from the divider 274 are supplied to a nine-gate sequential phase/frequency detector 280, which is of conventional design. The detector 280 produces digital output pulses on either of two outputs 282 or 284 which indicate the magnitude and direction of any frequency difference between the reference input and variable input, i.e., whether the variable input frequency is too high or too low compared to the reference input frequency, and by how much. Provision of dividers 274 and 276, which divide down the reference and variable frequencies to still a fairly high frequency of, for example, 100 KHz will result in output pulse widths from the detector 280 which will be very nearly linearly proportional to the size of the frequency difference or offset between the two inputs. For example, if the variable input frequency to the detector 280 is too high, the output 282 will produce digital output pulses whose widths indicate the degree to which the variable input frequency is higher than the reference input frequency. Similarly, output pulses on the output 284 would indicate when the variable input frequency is lower than the reference input frequency and the width of the pulses would indicate the degree of offset.

The detector 280 is coupled to an operational amplifier 286 which produces a DC output voltage which indicates whether the variable input frequency is higher or lower than the reference frequency and by how much. This signal is supplied to the microcontroller 300 (FIG. 2) which then signals oscillators in the transponder tuner 116, audio carrier tuners 150, data carrier tuners 154 and the pilot signal tracking tuner 158 to adjust their output frequencies slightly either upwardly or downwardly to compensate for the detected offset of frequencies by the digital frequency discriminator 270. The amount of such adjustment would be only a few cycles per second since eventually, the frequencies of the variable input signal and reference input signal to the detector 280 (FIG. 3) would be close enough to obviate the need for significant adjustment thereafter. Of course if offsets were detected by the digital frequency discriminator 270 later on, then adjustments could again be made. The microcontroller 300 could be any type of stored program control microprocessor such as, for example, the 80 C 188 Intel microprocessor.

Unlike most prior art frequency discriminators (which are based on resonant circuits such as parallel resonant L-C tank circuit, ceramic phase shifting element, etc. and are thus affected by temperature and aging), the digital frequency discriminator 270 of the present invention is controlled entirely by a highly stable crystal oscillator frequency (crystal 272) and can handle a relatively large frequency swing of the master local oscillator 204, all with very linear and accurate results.

Although not specifically shown in FIG. 3, the crystal oscillator 272 could also be used to provide the reference frequencies to the reference frequency generators 228 and 242 of the quadricorrelator frequency discriminator 220.

Although the specific embodiment of the communication system of the present invention described above was shown as a satellite communication system, it should be understood that the invention could also be utilized in a variety of communication systems where the need for following drift and/or dispersion was present. For example, the system of the present invention could also be utilized in ground-to-ground radio transmission, transmission systems which utilized fiber optics, etc.

It is to be understood that the above-described arrangements are only illustrative of the application of the principles of the present invention. Numerous modifications and alternative arrangements may be devised by those skilled in the art without departing from the spirit and scope of the invention and the appended claims are intended to cover such modifications and arrangements.

We claim:

1. In a signal receiving station having a receiving antenna for receiving a first transmitted signal which includes one or more information carrier frequencies and a pilot frequency which is separated in frequency from each one or more carrier frequencies by a respective predetermined amount, and a convertor means for converting down proportionately the frequencies in the first transmitted signal to a baseband signal,
a system for tracking and correcting any frequency drift and dispersion of the carrier frequencies and pilot frequency in the baseband signal, comprising
one or more carrier tuner means, each for receiving the baseband signal and each including
means for deriving from the baseband signal an IF carrier signal representing a respective carrier frequency,
carrier mixer means for mixing the IF carrier signal and a first local oscillator signal to produce a resultant IF information signal,
means for demodulating the resultant IF information signal to recover transmitted information, and
pilot tuner means for receiving the baseband signal and including
means for deriving from the baseband signal an IF pilot signal representing the pilot frequency,
pilot mixer means for mixing the IF pilot signal and the first local oscillator signal to produce a resultant pilot signal,
local oscillator means responsive to a first control signal level for developing the first local oscillator signal having a frequency corresponding to the first control signal level and for supplying the first local oscillator signal to the carrier mixer means and pilot mixer means to compensate for any frequency drift or dispersion of frequency of the IF carrier signals and IF pilot signal, and
frequency discriminator means for detecting frequency drift and dispersion of the resultant pilot signal from a predetermined center frequency and for supplying to the local oscillator means the first control signal whose level identifies the frequency drift and/or dispersion, of the resultant pilot signal to thereby cause the local oscillator means to produce the first local oscillator signal which, when supplied to the carrier mixer means and pilot mixer means, compensates for any frequency drift and frequency dispersion occurring in the IF carrier signals and IF pilot signal from their operating frequencies, the frequency discriminator means including a first frequency discriminator means for generating the first control signal, the first control signal comprising a coarse control signal and a digital frequency discriminator means operatively connected to the first frequency discriminator means, the digital frequency discriminator means including a crystal oscillator means which is operatively connected to the a frequency detector for adjusting one or more operating frequencies of the carrier tuner means to track changes in the information carrier frequencies.

2. A system as in claim 1 wherein said frequency discriminator means includes
a first signal source for producing a first reference frequency signal,
a second signal source for producing a second reference frequency signal which is 90 degrees out of phase with the first reference frequency signal,
a first mixer for mixing the resultant pilot signal and the first reference frequency signal to produce a phase error control signal,
a second mixer for mixing the resultant pilot signal and the second reference frequency signal to produce a first frequency error signal,
differentiation means for receiving the first frequency error signal and for producing a signal representing the derivative of the first frequency error signal, multiplier means for generating the product of the phase error signal and the derivative signal to produce a frequency error control signal, and switch means for selectively supplying the phase error control signal and frequency error control signal to the local oscillator means to switch from coarse tuning to fine tuning in response to when information of at least a predetermined accuracy is obtained from the carrier frequencies.

3. A system as in claim 2 further including a loop filter and integrator means coupled between the switch means and the local oscillator means for producing the first control voltage signal for supply to the local oscillator means to control the frequency of the first local oscillator signal.

4. A system as in claim 3 wherein said switch means includes means for supplying the frequency error control signal to the loop filter in response to a first switch control signal, and for supplying the phase error control signal to the loop filter in response to a second switch control signal, said system further including control means responsive to initial receipt of the demodulated resultant IF information for supplying the first switch control signal to the switch means, and for supplying the second switch control signal to the switch means when the demodulated resultant IF information is determined to be accurate, and means for supplying demodulated resultant IF information from the demodulating means to the control means.

5. A system as in claim 4 wherein the digital frequency discriminator means includes the crystal oscillator means for developing an output reference frequency signal, and means for developing a DC output voltage whose value is proportional to the difference between the frequency of the local oscillator means and the crystal oscillator means, wherein said convertor means includes at least one phase lock loop circuit which includes a convertor oscillator for producing a convertor oscillatory signal, and a mixer for mixing the transmitted signal and the convertor oscillatory signal to produce the baseband signal, said control means being adapted to adjust the frequency of the convertor oscillatory signal in response to the DC output voltage to thereby reduce the frequency difference between the local oscillator means and crystal oscillator means.

6. A system as in claim 5 wherein said digital frequency discriminator means further includes the frequency detector means for producing on a first output a first digital output pulse train if the frequency of the local oscillator means is higher than the frequency of the reference frequency signal, and for producing on a second output a second digital output pulse train if the frequency of the local oscillator means is lower than the frequency of the reference frequency signal, the width of the pulses in each pulse train being proportional to the magnitude of the difference between the frequencies, and operational amplifier means for developing the DC output voltage whose value indicates which of the local oscillator means frequency and reference signal frequency is higher and indicates an amount such local oscillator means frequency and such reference signal frequency differ from each other.

7. In a satellite transmission system in which information signals are relayed by satellites to ground receivers, said signals including a plurality of carrier frequencies which include at least one or more audio carrier frequencies containing audio information, and/or data carrier frequencies containing data information, and a pilot frequency separated by predetermined frequency differences from the audio carrier frequencies and/or the data carrier frequencies, a ground information signal receiver system comprising receiving means for receiving an information signal relayed by a satellite, means coupled to the receiving means for down-converting the frequencies in the information signal to a baseband signal containing frequencies corresponding to the audio and/or data carrier frequencies and pilot frequency, and separated in frequency by amounts proportionate to the separation of the carrier and pilot frequencies in the information signal, a plurality of carrier tuner means, each for receiving the baseband signal and deriving therefrom an IF carrier signal containing information corresponding to the information contained in a respective one of the carrier frequencies, and each including carrier mixer means for mixing the IF carrier signal and a first compensating oscillatory signal to produce a resultant information signal, and means for demodulating the resultant information signal to recover the information contained therein, and pilot tuner means for receiving the baseband signal and deriving therefrom an IF pilot signal whose frequency is separated from the frequencies of the IF carrier signals proportionately to the separation of the pilot frequency from the audio and/or data carrier frequencies in the information signal, said pilot tuner means comprising pilot mixer means for mixing the IF pilot signal and the first compensating oscillatory signal to produce a resultant pilot signal, compensating oscillator means responsive to a first voltage signal for producing the first compensating oscillatory signal having a frequency determined by the level of the first voltage signal, and for supplying the first compensating oscillatory signal to the carrier mixer means and the pilot mixer means, frequency detector means for detecting the frequency of the resultant pilot signal and any frequency drift or frequency dispersion of the resultant pilot signal from a predetermined center frequency, the frequency detector means comprising a first frequency discriminator means for generating the first control signal and a digital frequency discriminator means for adjusting one or more operating frequencies of the carrier tuner means to track changes in the information carrier frequencies, including a crystal oscillator means, the frequency detector means producing a signal representing the frequency drift or frequency dispersion of the resultant pilot signal, the signal representing the frequency drift or frequency dispersion being applied to a switch means and used for adjusting of the compensating oscillator means to track small changes in the either of the resultant pilot signal and the IF pilot signal, and means coupled to the switch means for supplying to the compensating oscillator means the first voltage signal whose level is a function of the detected frequency of the resultant pilot signal, so that the compensating oscillator means produces the first compensating oscillatory signal which, when mixed with the IF carrier signals and IF pilot signal, counters frequency drift and frequency dispersion occurring in the IF carrier signal and IF pilot signal signals by the amount of drift and dispersion detected in the resultant pilot signal.

8. A system as in claim 7 further including an information signal transmitter comprising one or more modulators, each for modulating audio or data information onto a corresponding carrier signal having a predetermined center frequency, a pilot signal oscillator means for producing a pilot signal having a frequency separated by predetermined frequency differences from the carrier frequencies, local oscillator means for producing a local oscillatory signal whose frequency varies in accordance with a dispersal waveform, generator means for supplying a periodically varying dispersal waveform to the local oscillator means, a signal mixer means, means for supplying to the signal mixer means the carrier signals, pilot signal, and local oscillatory signal to produce a composite signal with audio and/or data carrier frequencies, and a pilot frequency which are dispersed over a predetermined range, means for up-converting the frequencies in the composite signal to an information signal, and transmitting means for transmitting the information signal to the satellite.

9. In a signal receiving station having a receiving antenna for receiving a first transmitted signal which includes one or more information carrier frequencies and a pilot frequency which is separated in frequency from each one or more carrier frequencies by a respective predetermined amount, and a convertor means for converting down proportionately the frequencies in the first transmitted signal to a baseband signal, a system for tracking and correcting any drift and dispersion of the carrier frequencies and pilot frequency in the baseband signal, comprising one or more carrier tuner means, each for receiving the baseband signal and each including means for deriving from the baseband signal an IF carrier signal representing a respective carrier frequency, carrier mixer means for mixing the IF carrier signal and a first local oscillator signal to produce a resultant IF information signal, means for demodulating the resultant IF information signal to recover transmitted information, and pilot tuner means for receiving the baseband signal and including means for deriving from the baseband signal an IF pilot signal representing the pilot frequency, pilot mixer means for mixing the IF pilot signal and the first local oscillator signal to produce a resultant pilot signal, local oscillator means responsive to a first control signal level for developing the first local oscillator signal having a frequency corresponding to the first control signal level and for supplying the first local oscillator signal to the carrier mixer means and pilot mixer means to compensate for any drift or dispersion of frequency of the IF carrier signals and IF pilot signal, and frequency discriminator means for detecting frequency drift and dispersion of the resultant pilot signal from a predetermined center frequency and for supplying to the local oscillator means the first control signal whose level identifies the drift and/or dispersion of the resultant pilot signal, to thereby cause the local oscillator means to produce the local oscillator signal which, when supplied to the carrier mixer means and pilot mixer means, compensates for frequency drift and frequency dispersion occurring in the IF carrier signals and IF pilot signal from their operating frequencies, the frequency discriminator means including:

a first signal source for producing a first reference frequency signal, a second signal source for producing a second reference frequency signal which is 90 degrees out of phase with the first reference frequency signal, a first mixer for mixing the resultant pilot signal and the first reference frequency signal to produce a phase error control signal, a second mixer for mixing the resultant pilot signal and the second reference frequency signal to produce a first frequency error signal, differentiation means for receiving the first frequency error signal and for producing a signal representing the derivative of the first frequency error signal, multiplier means for generating the product of the phase error signal and the derivative signal to produce a frequency error control signal, and switch means for selectively supplying one of the phase error control signal and frequency error control signal to the local oscillator means when information of at least a predetermined accuracy is obtained from the carrier frequencies.

* * * * *